(12) United States Patent
Chadbourne et al.

(10) Patent No.: US 10,904,393 B2
(45) Date of Patent: Jan. 26, 2021

(54) SCHEDULING COMMUNICATION SYSTEM AND METHOD

(71) Applicant: Second Guest Ltd, Stockport (GB)

(72) Inventors: Andy Chadbourne, Stockport (GB); Simon Ashford, Hinckley (GB)

(73) Assignee: SECOND GUEST LTD, Wokingham (GB)

( * ) Notice: Subject to any disclaimer, the term of this patent is extended or adjusted under 35 U.S.C. 154(b) by 0 days.

(21) Appl. No.: 16/192,089

(22) Filed: Nov. 15, 2018

(65) Prior Publication Data

US 2019/0356784 A1   Nov. 21, 2019

(30) Foreign Application Priority Data

Nov. 15, 2017   (GB) .................................. 1718860.8

(51) Int. Cl.
*H04M 3/42* (2006.01)
*H04M 3/56* (2006.01)
*G10L 13/02* (2013.01)
*H04M 3/523* (2006.01)
*H04M 3/53* (2006.01)

(52) U.S. Cl.
CPC ............. *H04M 3/565* (2013.01); *G10L 13/02* (2013.01); *H04M 3/5231* (2013.01); *H04M 3/5307* (2013.01)

(58) Field of Classification Search
CPC .. H04M 3/565; H04M 3/5231; H04M 3/5307; G10L 13/02
USPC ........................................ 379/210.01, 201.01
See application file for complete search history.

(56) References Cited

U.S. PATENT DOCUMENTS

| | | | | |
|---|---|---|---|---|
| 5,737,728 A | * | 4/1998 | Sisley | G06Q 10/06 705/7.16 |
| 8,599,871 B2 | * | 12/2013 | Sayeedi | H04W 68/12 370/443 |
| 10,402,866 B2 | * | 9/2019 | Murgai | G06Q 30/0269 |
| 2001/0024497 A1 | * | 9/2001 | Campbell | H04M 3/5125 379/265.09 |
| 2003/0007621 A1 | * | 1/2003 | Graves | H04M 3/5191 379/219 |
| 2004/0063432 A1 | * | 4/2004 | Borsan | H04M 3/42195 455/445 |
| 2006/0165066 A1 | * | 7/2006 | Campbell | H04M 3/5125 370/352 |
| 2009/0061833 A1 | * | 3/2009 | Ho | H04M 1/72552 455/414.2 |

(Continued)

*Primary Examiner* — William J Deane, Jr.
(74) *Attorney, Agent, or Firm* — Leason Ellis LLP

(57) ABSTRACT

A scheduling communication system and method are disclosed. The system comprises a gateway comprising a telephony interface, a data repository; and, a scheduling interface. The gateway stores, in the data repository, a registration for a user associated with a booking, the registration including a telephone number for the user. Upon receiving a data communication at the scheduling interface on the booking, the gateway triggers a telephone call via the telephony interface to the user's telephone number and outputs verbal information on the booking. Upon receiving an input from a user during a call from the telephone number via the telephony interface, the gateway generates a data communication on the input and communicate the data communication on the input via the scheduling interface.

14 Claims, 5 Drawing Sheets

(56) References Cited

U.S. PATENT DOCUMENTS

2016/0127554 A1\* 5/2016 Turcan .............. H04M 3/42323
379/265.09

\* cited by examiner

|  | SMS | Call | Guest Pref |
|---|---|---|---|
| Party Created | ☑ | ☐ | ☐ |
| Party Delayed | ☑ | ☐ | ☐ |
| Party Expedited | ☑ | ☐ | ☐ |
| Party Ready | ☐ | ☐ | ☐ |
| Party Reminded | ☐ | ☐ | ☐ |
| Party Cancelled | ☑ | ☐ | ☐ |

Fig. 5

SCHEDULING COMMUNICATION SYSTEM AND METHOD

CROSS REFERENCE TO RELATED APPLICATIONS

This application is based on and claims priority to UK Patent Application No. 1718860.8, filed 15 Nov. 2017, the contents of which are incorporated by reference in its entirety as if set forth herein.

FIELD OF THE INVENTION

This invention relates to methods, a platform, apparatus, and systems for communications associated with scheduling of events, resources and the like.

BACKGROUND TO THE INVENTION

There are many situations that require scheduling. It is not always possible, convenient or desirable for people to wait in line for a resource to become available or to attend an event. Even where this is possible, it is not desirable for the resource/event owner who would need to accommodate those people while waiting. Not only does a more sophisticated form of scheduling make for a better user experience, it can also help a business owner with internal scheduling of staff, resources, stock and the like because the further into the future schedules can be planned and predicted, the greater the chance that under/over utilisation of resources can be avoided.

Although many systems exist that can assist with demand planning, a variety of industries find that they are approached by potential customers who wish to use or purchase their goods and/or service, but that they then have to either turn away or ask them to wait.

Such industries may include, but are not limited to: waiting for a table in a restaurant, bar or café, waiting for food to be prepared in a fast food restaurant, waiting for a lane in a bowling alleys, wishing to take a bike, boat or other leisure activity rental, waiting for a place to become available at a casino table or card room and the like.

Current methods employed to manage waiting lists range from no system at all, simple pen and paper, all the way through to dedicated integrated computers systems.

When the resource, goods or service are ready, the potential customer need be notified. If they are waiting, for example in a queue, this is straight-forward. However, as discussed above, this is undesirable from both a user experience and business resource (to accommodate and run the queue) perspective. In many systems, notification is accomplished by verbal announcements in person or over a speaker system, apps that customers can download to their handheld devices or, the most common method, the use of physical radio-based paging devices.

All of these have advantages and disadvantages. Verbal announcements can have limited range and require the person to hear the announcement and be paying attention. Apps require a compatible device, a user willing to use bandwidth to download them and provision of personally identifiable information during registration (which typically isn't a short process).

The paging devices, although suitable for some environments, have a range of drawbacks, most notably: they are very expensive to purchase, they are expensive to replace when lost or stolen, they have limited range and can usually only be used on-site, they are typically bulky to carry around and they can run out of battery.

As a result, a need exists to provide a method of allowing a potential customer to reserve any form of resource/goods/service—therefore becoming a reservee—and then have them automatically notified when their reservation is ready. Additionally, a need exists to have such a system not be reliant on cumbersome, proprietary hardware, not be limited in range to a short distance and not require the reservee to carry around a dedicated device, download specific application software or subscribe/complete a complex online registration.

SUMMARY OF THE INVENTION

According to an aspect of the present invention, there is provided a scheduling communication system comprising a gateway comprising a telephony interface, a data repository and a scheduling interface, the gateway being arranged to store, in the data repository, a registration for a user associated with a booking, the registration including a telephone number for the user, the gateway being responsive, upon receiving a data communication at the scheduling interface on the booking, to trigger a telephone call via the telephony interface to the user's telephone number and output verbal information on the booking, the gateway being further responsive, upon receiving an input from a user during a call from the telephone number via the telephony interface, to generate a data communication on the input and communicate the data communication on the input via the scheduling interface.

The gateway and/or scheduling interface preferably includes a staff interface that allows staff to take the personal details of the reservee and enter them into the data repository. Such details depend on the resource being scheduled. In the case of dining, these may include, but are not limited to, the reservee name, phone number, number of people in their party and specific requirements they may have. The staff interface may be accessed from a fixed computer station or via a mobile handheld device.

In one embodiment, the staff interface may include, or interface to, a local resource management system. For example, it may include an interface allowing wait staff in a restaurant to indicate when tables become free. In such an arrangement, the system can be pre-programmed (or have a user entry field for use by the wait staff) to identify seats available and could then select the next client waiting in the virtual queue that can be seated at the available table (it may take into account wait time, loyalty, whether it is best use of the resource taking into account how many seats may be left unoccupied etc).

The verbal information may be a pre-recorded message or it may be generated by a computer synthesis speech system.

Embodiments of the present invention include a method of reserving goods and/or services with automated updates and the ability to apply benefits or discounts.

A preferred embodiment includes a core reservation module, capable of managing a list of reservations.

A preferred embodiment includes a reservation message module, responsible for generating automated messages and readying the messages for sending.

A preferred embodiment includes an outbound communication module, configured to make automated phone calls for outbound messages.

A preferred embodiment includes an inbound communication module, configured to receive phone calls and automatically process them.

A preferred embodiment includes a benefit module that monitors the wait time of a reservee and automatically applies benefits to their account based on this wait time. For example, a wait time of 30 minutes may automatically present the reservee with 10% off the value of the goods or service. A further 15 minutes delay may increase this discount from 10% to 20%.

The staff interface may include a graphical user interface, which is used as the interface between the system and the users, this interface may be a static website, dynamically generated website, app, or other system to user application.

The reservation module may include a database capable of securely storing reservee information and the time and status of reservations. Optionally, the reservation module may include an Application Programming Interface (API) to allow the module to communicate with other $3^{rd}$ party systems.

The benefit module may include a benefit database, that stores metrics or events that lead to a particular benefit being issued and the resulting benefit.

The telephony interface may include an input engine, configured to receive calls and process these messages accordingly (for example, detect verbal inputs or DTMF tones to navigate a presented user interface and then relay the user inputs to the scheduling interface, an output engine, configured to make automated calls, a parsing engine, configured to merge information stored in a database with pre-determined text that will be used to generate the automated voice calls.

Optionally, the telephony interface may include a processor arranged to execute code to apply rule logic to determine, for example, if a duplicate reservation is being made or if a phone number provided is real and is not a premium rate number. The rule logic may also be arranged to determine the country of origin of a phone number and allow or deny messages and calls to that number based on pre-determined rules.

The telephony interface may include an API interface to an external phone call services.

It will be appreciated that the scheduling communication system can operate as an outsourced service, providing multiple virtual queues to each of one or more suppliers of resources. Additionally, the scheduling communication system acts as a trusted source to end users—should they wish, they can register directly with the scheduling communication system, manage contact preferences and never divulge personal or contact information to the suppliers of resources. The scheduling communication system acts as a transparent intermediary to both users and suppliers.

BRIEF DESCRIPTION OF THE DRAWINGS

Embodiments of the present invention will now be described in detail, by way of example only, with reference to the accompanying drawings in which.

DETAILED DESCRIPTION

Figure 1:
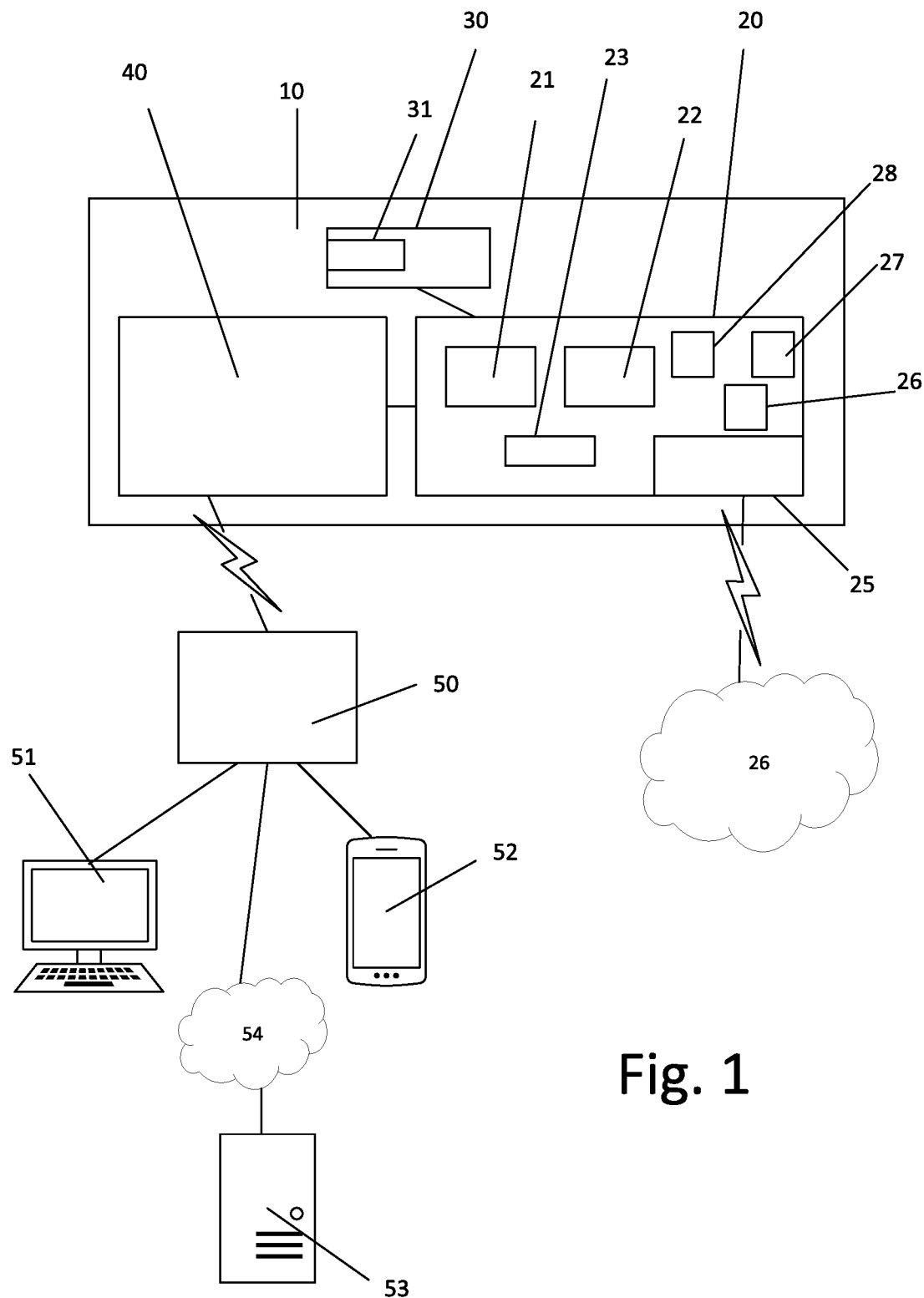
FIG. 1 is a schematic diagram of a scheduling communication system according to an embodiment.

FIG. 1 is a schematic diagram of a scheduling communication system according to an embodiment.

The scheduling communication system 10 comprises a gateway 20, a data repository 30, and a scheduling interface 40. The gateway preferably includes a processor 21, a memory 22 and a computer-readable storage medium 23 incorporating code having control logic for enabling execution the scheduling communication system 10 when executed by the processor 21 and memory 22. Preferably, the code configures the processor 21 to execute and operate the scheduling communication system as set out below.

The gateway further comprises a telephony interface 25. This may, for example, be a hardware interface to a PSTN, ISDN network or similar. It may also be or include a computer-implemented interface that provides access to voice over IP telephony or other telephony networks. The telephony interface is connected to a telephony network 26.

The gateway 20 is configured to communicate, via the scheduling interface 40, with a local resource management system 53, a web booking form and/or other systems, of an entity that uses the scheduling communication system 10 to handle its bookings/reservations.

The gateway 20 is configured to store, in the data repository 30, data on a registration received via the scheduling interface 40 for a user associated with a booking.

The data includes a telephone number for the user. The scheduling communication system 10 maintains a virtual queue 31 for the entity, each user having a booking being placed in the queue and having their entry in the queue linked to their data in the data repository 30. The gateway 20 is responsive, upon receiving a data communication at the scheduling interface 40 on the booking, to trigger a telephone call via the telephony interface 25 to the user at the telephone number in the data repository and output verbal information on the booking. The gateway 20 is further responsive, upon receiving an input from a user during a call from the telephone number via the telephony interface 25, to generate a data communication on the input and communicate the data communication on the input via the scheduling interface 40 (for example, to the local resource management system 53). The scheduling communication system 10 may further comprise an inbound communication module 27 configured to receive a phone call via the telephony interface 25, automatically capture a user input from the call and apply the inputs to a booking in the data repository 30 linked to the telephone number of the caller. In one embodiment, the resource management system 53 is independent of the scheduling communication system and accessed via a data communications network 54. In one embodiment, the data repository 30 of the gateway 20 is independent of the resource management system 53 which manages a resource available to be booked by users. Each booking includes a telephone number for the user. Upon receiving a data communication on the booking, the scheduling communication system 10 triggers a telephone call to the user's telephone number and outputs computer-composed verbal information on the booking. Upon receiving an input from a user during a telephone call from the telephone number, the scheduling communication system 10 identifies the booking in the data repository 30 using the telephone number of the caller and modifies the booking in dependence on the input. In one embodiment, the scheduling communication system 10 receives, from the resource management system 53, data on availability of the resource, it determines whether the booking closest to or at the head of the queue in which the availability of the resource satisfies the booking, retrieves the telephone number for the booking triggers the telephone call to the user's telephone number and outputs computer-composed verbal information on the booking.

The gateway and/or scheduling interface preferably includes a staff interface 50 that allows staff to take the personal details of the reserve (over the phone, in person etc) and enter them into the data repository 30. Such details depend on the resource being scheduled. In the case of dining, these may include, but are not limited to, the reservee name, phone number, number of people in their party and specific requirements they may have. The staff interface may be accessed from a fixed computer station 51 or via a mobile handheld device 52.

Optionally, personal details may also include demographic profile information such as "family", "couple", "young", "old" etc. These may be entered by the staff or optionally made accessible to the reserve upon notification of their booking (or via a central account should they elect to maintain a perpetual account on the scheduling communication system. In such arrangements, the reserve is given the option of opting-in to marketing that is targeted based on their profile—such marketing may include calls or messages that are sent in addition to those on the booking or alternatively added as an extra option to calls on the booking.

In one embodiment, the staff interface may include, or interface to, the local resource management system 53. For example, it may include an interface allowing wait staff in a restaurant to indicate when tables become free. In such an arrangement, the system can be pre-programmed (or have a user entry field for use by the wait staff) to identify seats available and could then select the next client waiting in the virtual queue that can be seated at the available table (it may take into account wait time, loyalty, whether it is best use of the resource taking into account how many seats may be left unoccupied etc).

The verbal information may be a pre-recorded message or it may be generated by a computer synthesis speech system 26 (which may be part of the scheduling communication system (such as part of the telephony interface) or it may be a remote resource accessed over the internet or in some other way that is provided with a textual form of the message and returns a spoken version. It will be appreciated that embodiments may have multi-lingual capabilities with the computer synthesis system generating the verbal message in a language dependent on data for the reservee that is held in the data repository 30.

Figure 2:
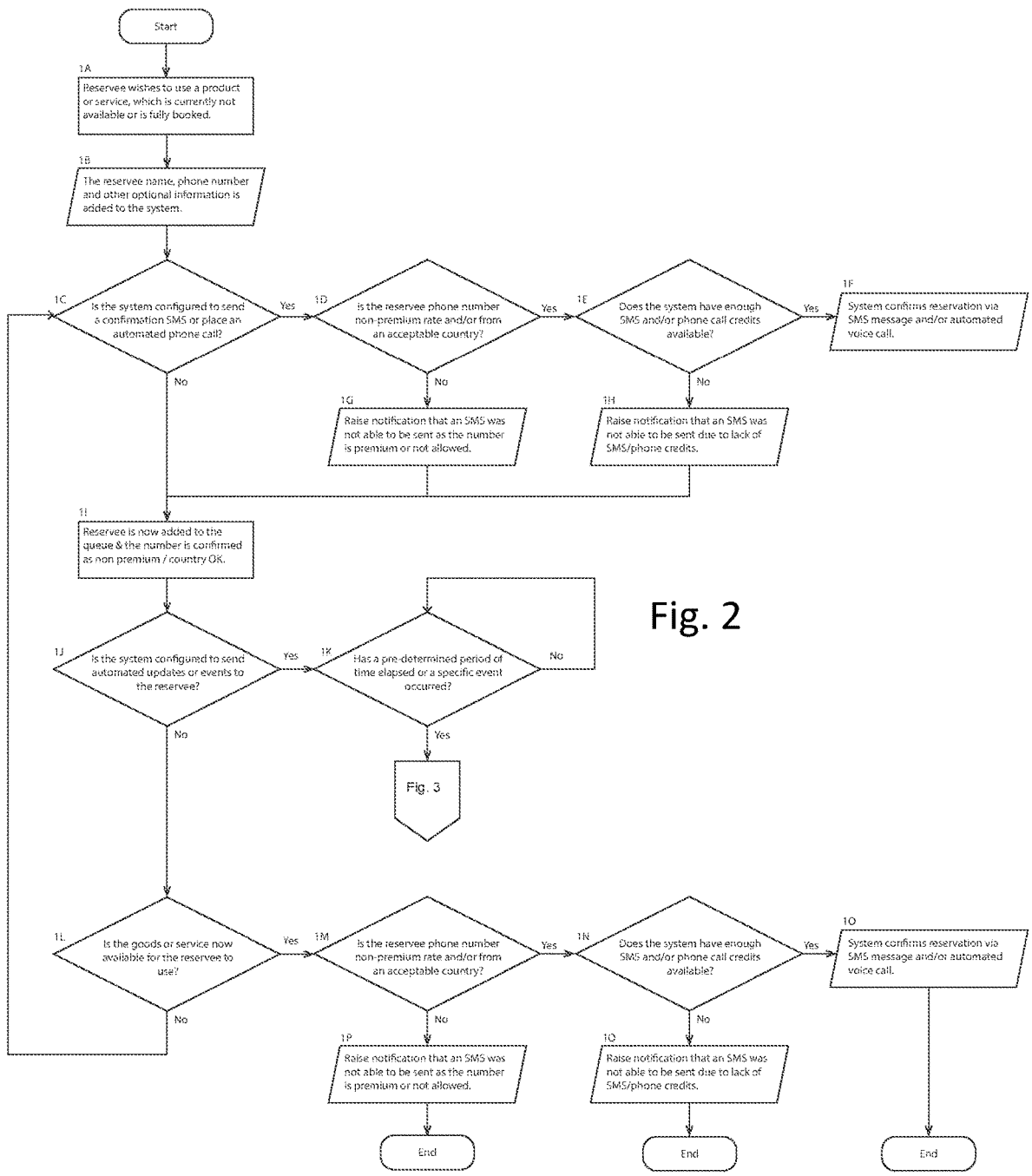
FIG. 2 is a flowchart of the reservation process performed using the system of FIG. 1.

FIG. 2 is a flow chart diagram of the main reservation flow according to an embodiment of the present invention.

1A: A potential customer (from now on referred to as a 'reservee') wishes to take advantage of the goods and/or services offered, but either the goods have a waiting time (such as 'fast' food being prepared) or the service is currently full (such as tables in a restaurant).

1B: A member of staff enters essential information from the reservee, preferably including but not limited to their name and phone number, into a staff interface at a local device connected to the scheduling communication system. Depending on the goods or services being offered, additional pertinent information will be taken at this stage. For example, such information may include the number of diners (restaurant) or size of bike and if helmets are required (bike rental).

The local device communicates the data to the gateway of the scheduling communication system via its scheduling interface for registration in its data repository. The scheduling communication system may be optionally configured to send a confirmation text message or automated phone call to the reservee (1C). If this option is enabled then the system will perform two further validation checks (1D and 1E).

1D: To avoid the business receiving unexpectedly high charges as a result of mistake or fraud, the system will preferably run basic checks to determine that the number provided by the reservee is neither premium rate or has an origin in a country where excessive connection charges are present.

If the number passes checks in 1D then the system will then establish if the business has enough credits in their account in order to send the message or make the call (1E).

On the basis that 1D and 1E are passed, the system will send either a confirmation text message, initiate an automated phone call, or both to the reservee (1F).

On the basis that either 1D or 1E did not pass, an internal message will be raised to the business (1G and 1H) alerting them at the stage the confirmation failed.

Regardless of if a confirmation is sent to the reservee (1C), their details will now be added into the system (1I) and they are placed in the virtual queue. The result of check 1D is now stored in the reservation to avoid having to repeat this check on the number again.

Optionally, the system can be configured to send automated updates to the reservee based on pre-determined time intervals or specific events. If this function is enabled (1J) then the system will check if either of these conditions has occurred (1K) and process events accordingly. A detailed description of this process is covered in FIG. 2.

Communications and updates are sent via the scheduling communication system's telephony module as simulated voice messages to the user's phone. Reservations are indexed by the user's phone number. Optionally, a reservation ID or number may also be assigned for use by the staff interface (or for use in interfacing with external resource management systems that may provide data to the gateway via the scheduling interface when resources are available or expected to be available). In such an arrangement, the data repository will index by telephone number and allow lookup between phone number and reservation ID to interface the multiple systems. Indeed, should the reservee wish, he or she could register directly with the system/gateway and be given a user ID or similar for use in reserving the resource in place of a mobile phone number. In this way the reservee's mobile phone number does not need to be disclosed to the restaurant or other facility but the restaurant can still contact the reservee via the gateway and scheduling interface.

Preferably, the user can interact with the scheduling communication system by making a call to a predetermined number (the reservation will preferably be retrieved based on the caller ID of the user's phone and no log-in etc is needed). Interaction may be via key presses to interact with an IVR system or similar or it may be via voice recognition. An artificial intelligence engine such as a chatbot or other system may be provided, either for IVR, voice or both. Preferably, notification calls made by the scheduling communication system also offer the called user the opportunity to interact with the system and update reservations (such as postpone or cancel their reservation), provide feedback etc. This can be via the same mechanisms described above.

When the reservee gets to the top of the virtual queue (1L) they will then be notified that their resource/goods/services are now ready for them to use (1N). Preferably, the notification also gives the reserve the option (for example via a voice input or DTMF tone input to accept the reservation or delay it. Upon a reserve inputting to delay a reservation, the gateway is configured to communicate via the scheduling interface with the local resource management system for the booking to report deferral of the reservation and obtain an updated booking for the reserve.

In selected embodiments, the scheduling communication system may include a credit based charging module and reservation availability communications may only be initiated if the business and/or the user has enough credits in the system (1M).

Figure 3:
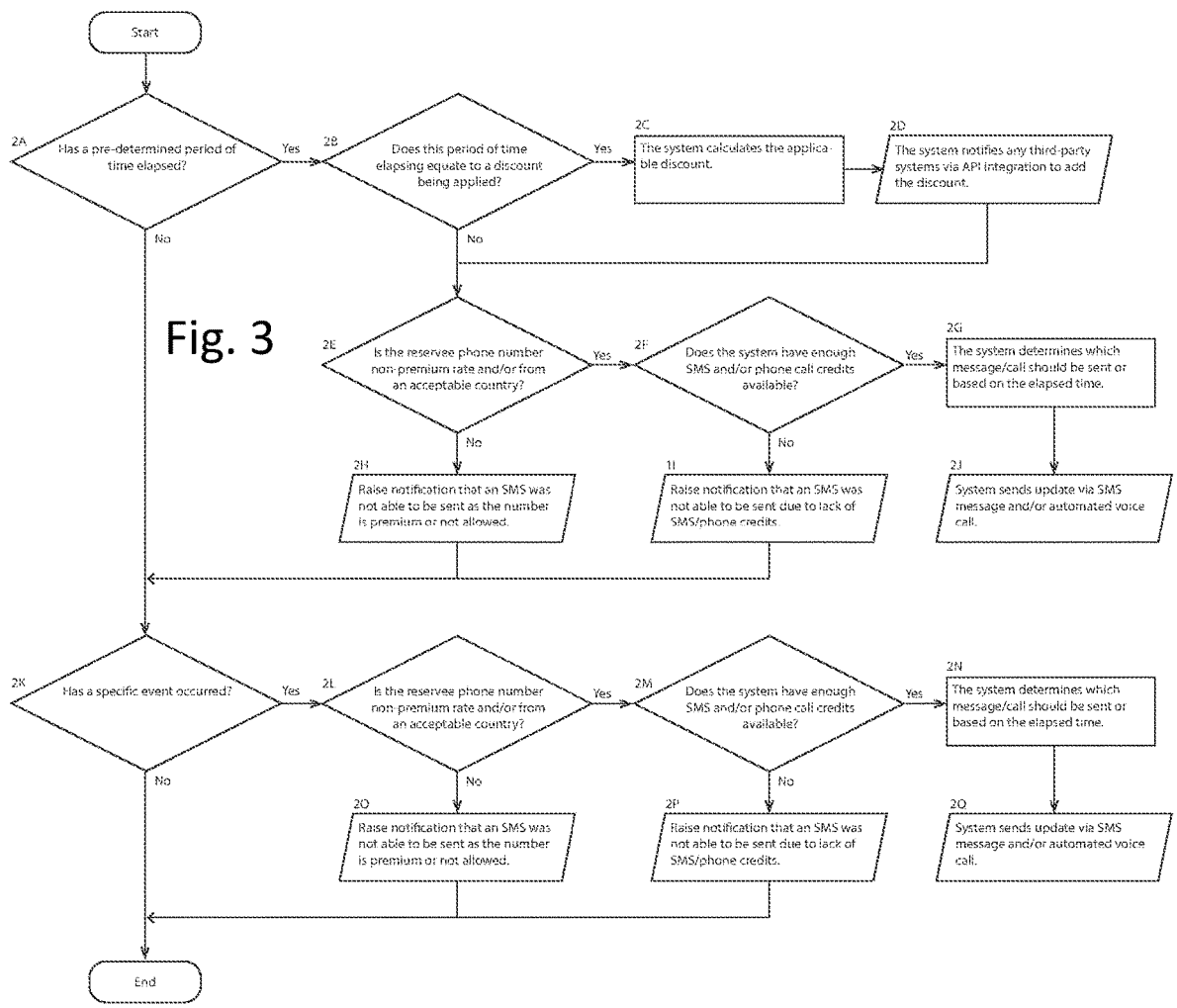
FIG. 3 is a flowchart of the reservee update process performed using the system of FIG. 1.

FIG. 3 is a flow chart diagram of the process used to update a reservee according to an embodiment of the present invention.

If a pre-determined period of time elapsed:

The system first checks if a pre-determined period of time has elapsed since the reservation was made (2A). These timings are pre-determined by the staff in the reservation application, but will preferably be in the form of X minutes following reservation—for example, 30 minutes after a reservation.

If a pre-determined period of time has elapsed (2A) the system will check if the time is eligible for a discount or perk to be applied (2B). Such a discount or perk may be a percentage off their meal due to an extending waiting time, or an additional 30 minutes rental of a boat. The type of discount/perk is calculated by the system (2C) and, if required, the system can then notify third-party systems of the discount via an API call (2D).

2E: To avoid the business receiving unexpectedly high charges as a result of mistake or fraud, the system will run basic checks to determine that the number provided by the reservee is neither premium rate or has an origin in a country where excessive connection charges are present.

If the number passes checks in 2E then the system will then establish if the business has enough credits in their account in order to send the message or make the call (2F).

On the basis that 2E and 2F are passed, the system will determine which message should be sent to the reservee (2G) and then send either a confirmation text message, initiate an automated phone call, or both to the reservee (2J).

On the basis that either 2E or 2F did not pass, an internal message will be raised to the business (2H and 2I) alerting them at the stage the confirmation failed.

If a specific event has occurred:

Next, the system first checks if a pre-determined event has occurred (2K). These events are pre-determined by the resource's staff in the local resource management system or via some other system and communicated to the gateway via the scheduling interface. An example of an event may be a live act is about to perform in the bar or the restaurant has laid on some bar snacks for those waiting.

2L: To avoid the business receiving unexpectedly high charges as a result of mistake or fraud, the system will run basic checks to determine that the number provided by the reservee is neither premium rate or has an origin in a country where excessive connection charges are present.

If the number passes checks in 2L then the system will then establish if the business has enough credits in their account in order to send the message or make the call (2M).

On the basis that 2L and 2M are passed, the system will determine which message should be sent to the reservee (2N) and then send either a confirmation text message, initiate an automated phone call, or both to the reservee (2Q).

On the basis that either 2L or 2M did not pass, an internal message will be raised to the business (2O and 2P) alerting them at the stage the confirmation failed.

Figure 4:
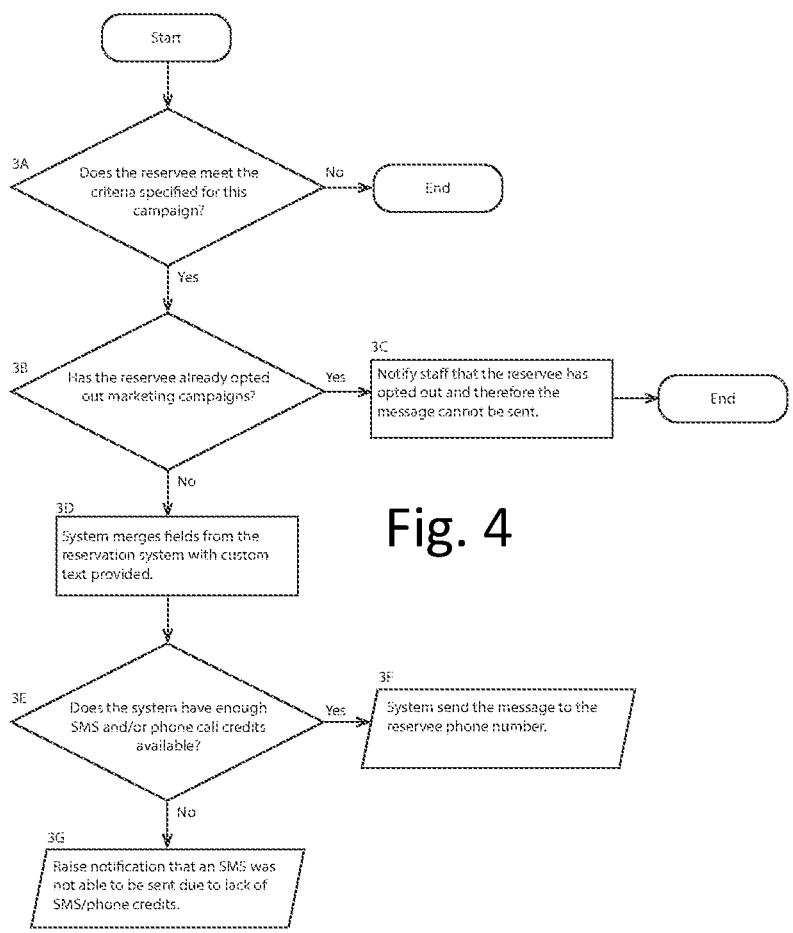
FIG. 4 is a flowchart of the direct marketing process performed using the system of FIG. 1; and, FIG. 5 is a screenshot of an interface provided to staff either on mobile devices or via the local resource management system.

FIG. 4 is a flow chart diagram of the direct marketing process according to an embodiment of the present invention.

Before sending a campaign, certain criteria will be specified such as the date the reservee used the service, how long they waited, etc. The reservee contacts in the system will be evaluated against this criteria (3A) to determine if they should be on the recipient list.

Text messaging, in most countries, is an opt-out service and so the system will need to maintain a list of opt-out flags in the database. Step 3B checks to see if the recipient should receive a message or not.

Following 3B, any contacts will now be filtered and have not opted out. The system then merges user created content with merged system fields (3D) to form the final message to be delivered.

The system needs to check that enough credits exist in the system before messages can be sent (3E), if there are enough then the message is sent, if not then a warning is generated.

FIG. 5 is a screenshot of an interface provided to staff either on mobile devices or via the local resource management system.

Preferably, the interface communicates via the scheduling interface or some other interface with the scheduling communication system and enables the staff to interact with the scheduling communication system and those reservee's in the virtual queue.

For example, staff can update actions taken upon an event taking place, typically which events trigger a communication with the reservee. Optionally, the interface may enable the staff to change the message provided and/or to enter a bespoke message to a particular reserve. While it is preferred that communication preferences will be applied to all reservees in the establishment's virtual queue, the interface may receive inputs for staff to override those communication settings for a particular reservee in the queue. Optionally, the interface may be configured to receive inputs from the staff and communicate these to the scheduling communication system to manipulate the virtual queue—for example to expedite a reservee.

It will be appreciated that the data repository may take various forms including a central or distributed file store, database (such as SQL or other relational or non-relational database types). It may be implemented using storage devices such as hard disks, random access memories, solid state disks or any other forms of storage media. It will also be appreciated that the processor discussed herein may represent a single processor or a collection of processors acting in a synchronised, semi-synchronised or asynchronous manner. For example, a master server system may maintain the scheduling communication system and be responsible for interaction with one or more autonomous gateways for generating the calls to those on the virtual queue(s). Software on the local resource management system may, via the scheduling interface, be the "processor" responsible for updating reservations. Alternatively, there may be one or more central processors that receive messages via the scheduling interface, determine the relevant entries in the data repository and cause updating/triggering of action based on the messages.

It is to be appreciated that certain embodiments of the invention as discussed above may be incorporated as code (e.g., a software algorithm or program) residing in firmware and/or on computer useable medium having control logic for enabling execution on a computer system having a computer processor. Such a computer system typically includes memory storage configured to provide output from execution of the code which configures a processor in accordance with the execution. The code can be arranged as firmware or software, and can be organized as a set of modules such as discrete code modules, function calls, procedure calls or objects in an object-oriented programming environment. If implemented using modules, the code can comprise a single module or a plurality of modules that operate in cooperation with one another.

Optional embodiments of the invention can be understood as including the parts, elements and features referred to or indicated herein, individually or collectively, in any or all combinations of two or more of the parts, elements or features, and wherein specific integers are mentioned herein which have known equivalents in the art to which the invention relates, such known equivalents are deemed to be incorporated herein as if individually set forth.

Although illustrated embodiments of the present invention have been described, it should be understood that various changes, substitutions, and alterations can be made by one of ordinary skill in the art without departing from the present invention which is defined by the recitations in the claims below and equivalents thereof.

The invention claimed is:

1. A scheduling communication system comprising:
   a gateway comprising a telephony interface;
   a data repository; and, a scheduling interface,
   the gateway being arranged to store, in the data repository, a registration for a user associated with a booking, the registration including a telephone number for the user, the gateway being responsive, upon receiving a data communication at the scheduling interface on the booking, to trigger a telephone call via the telephony interface to the user's telephone number and output verbal information on the booking, the gateway being further responsive, upon receiving an input from a user during a telephone call from the telephone number via the telephony interface, to generate a data communication on the input and communicate the data communication on the input via the scheduling interface.

2. The scheduling communication system of claim 1, further comprising a remote staff interface configured to receive data on a user to make the booking, the remote staff interface being configured to communicate data on the user and the booking to the scheduling communication system, the scheduling communication system being configured to generate a record in the data repository linking the user to the booking.

3. The scheduling communication system of claim 2, further comprising a handheld device configured to provide the remote staff interface to staff manning a resource that is the subject of the booking.

4. The scheduling communication system of claim 2, further comprising a resource management system, the resource management system being independent of the scheduling communication system, the resource management system being configured to communicate, via the scheduling interface, with the scheduling communication system on availability of resources that are subject of bookings.

5. The scheduling communication system of claim 1, the data repository encoding a virtual queue of bookings, the virtual queue linking each booking to the user registration, wherein upon receiving a data communication at the scheduling interface on available resource, the scheduling communication system being configured to match the next booking in the virtual queue matching the available resource and to trigger a telephone call via the telephony interface to the user's telephone number and output verbal information on the availability.

6. The scheduling communication system of claim 1, further comprising a speech synthesis system being connected to the telephony interface, the speech synthesis system configured to generate the verbal information.

7. The scheduling communication system of claim 1, further comprising an inbound communication module, configured to receive a phone call via the telephony interface, automatically capture a user input from the call and apply the input to a booking in the data repository linked to the telephone number of the caller.

8. The scheduling communication system of claim 1, wherein the telephony interface include a processor configured to execute computer program code for executing an input engine, including:
   computer program code configured to receive a call via the telephony interface;
   computer program code configured to detect verbal inputs from a caller and to parse the verbal inputs to generate a booking operation;
   computer program code configured to detect DTMF tones from a caller and to parse the DTMF tones to generate a booking operation;
   computer program code configured to use the booking operation to automatically modify data on a booking in the data repository.

9. The scheduling communication system of claim 8, wherein the input engine further includes computer program code configured to apply predetermined rule logic to determine to oversee calls and prevent one or more predetermined exceptions arising from a call.

10. A scheduling communication system comprising:
    a gateway, a data repository, and a scheduling interface connected to a data communications network,
    the gateway including a processor, a memory and a computer-readable storage medium incorporating computer program code for executing the scheduling communication system, the gateway further comprising a telephony interface connected to a telephony network, wherein the processor is configured to execute the computer program code for executing the scheduling communication system including:
    computer program code configured to communicate, via the scheduling interface over the data communications network, with a resource management system that is independent of the scheduling communication system, the resource management system managing a resource available to be booked by users;
    computer program code configured to receive a booking for the resource and store, in the data repository, data on the booking and on a user associated with a booking, the data including a telephone number for the user;

computer program code configured to operate a virtual queue for the resource, including computer program code configured to place a data entry for each booking in the virtual queue and to link the data entry to the data on the booking in the data repository;

computer program code configured to trigger, upon receiving a data communication from the resource management system at the scheduling interface on the booking, a telephone call via the telephony interface to the user at the telephone number in the data repository and output verbal information on the booking.

11. The scheduling communication system of claim 10, wherein the computer program code configured to trigger the telephone call includes:

computer program code configured, upon receiving a data communication from the resource management system identifying availability of the resource, to match the available resource to the next applicable booking in the virtual queue, to retrieve the telephone number from the data repository that is linked to the booking and to trigger the telephone call to the telephone number.

12. A scheduling method comprising:

storing bookings in a data repository of a gateway that is independent of a resource management system managing a resource available to be booked by users, each booking including a telephone number for the user;

upon receiving a data communication on the booking, triggering a telephone call to the user's telephone number and outputting computer-composed verbal information on the booking;

upon receiving an input from a user during a telephone call from the telephone number, identifying the booking in the data repository using the telephone number of the caller and modifying the booking in dependence on the input.

13. The scheduling method of claim 12, further comprising:

linking a remote staff interface to the gateway, and providing the remote staff interface to staff operating the resource;

receiving, via the remote staff interface, a booking including the telephone number for the user making the booking; and, recording the booking data in the data repository and linking the booking data to an entry in a virtual queue at the gateway for the resource.

14. The scheduling method of claim 13, further comprising:

receiving, from the resource management system data on availability of the resource;

determining whether the booking closest to or at the head of the queue in which the availability of the resource satisfies the booking;

retrieving the telephone number for the booking; and, performing the step of triggering the telephone call to the user's telephone number and outputting computer-composed verbal information on the booking.

* * * * *